United States Patent
Hurwitz et al.

(10) Patent No.: US 8,074,605 B2
(45) Date of Patent: Dec. 13, 2011

(54) ODOR CONTROL ADDITIVE FOR ANIMAL LITTER

(75) Inventors: Marni Markell Hurwitz, Far Hills, NJ (US); Dave Narasimhan, Flemington, NJ (US); Ernest D. Buff, Far Hills, NJ (US)

(73) Assignee: I Did It, Inc., Far Hills, NJ (US)

( * ) Notice: Subject to any disclaimer, the term of this patent is extended or adjusted under 35 U.S.C. 154(b) by 61 days.

(21) Appl. No.: 12/583,690

(22) Filed: Aug. 24, 2009

(65) Prior Publication Data

US 2009/0314215 A1 Dec. 24, 2009

Related U.S. Application Data

(63) Continuation-in-part of application No. 11/348,723, filed on Feb. 7, 2006, now Pat. No. 7,637,229.

(51) Int. Cl.
*A01K 1/01* (2006.01)

(52) U.S. Cl. ........................... 119/171; 424/76.6

(58) Field of Classification Search .................. 119/171, 119/172, 173; 424/76.6, 76.5; 422/306, 422/1, 5

See application file for complete search history.

(56) References Cited

U.S. PATENT DOCUMENTS

| | | | |
|---|---|---|---|
| 3,675,625 A | 7/1972 | Miller et al. ............... 119/173 |
| 4,203,388 A | 5/1980 | Cortigene et al. ........... 119/172 |
| 4,405,354 A | 9/1983 | Thomas, II et al. ............ 71/21 |
| 4,407,231 A * | 10/1983 | Colborn et al. ............ 119/173 |
| 4,459,368 A | 7/1984 | Jaffee et al. .................. 502/80 |
| 4,517,919 A | 5/1985 | Benjamin et al. .......... 119/173 |
| 5,094,190 A | 3/1992 | Ratcliff et al. ............... 119/173 |
| 5,097,799 A | 3/1992 | Heitfeld et al. .............. 119/172 |
| 5,164,178 A * | 11/1992 | Muysson ..................... 424/76.4 |
| 5,183,655 A | 2/1993 | Stanislowski et al. ....... 424/76.6 |
| 5,329,880 A | 7/1994 | Pattengill et al. ........... 119/171 |
| 5,387,622 A * | 2/1995 | Yamamoto ..................... 523/102 |
| 5,634,431 A | 6/1997 | Reddy et al. ................. 119/173 |
| 5,746,019 A * | 5/1998 | Fisher .............................. 43/1 |
| 5,806,462 A | 9/1998 | Parr ............................. 119/173 |
| 5,975,019 A | 11/1999 | Goss et al. ................... 119/173 |
| 5,992,351 A | 11/1999 | Jenkins ........................ 119/173 |
| 6,206,947 B1 | 3/2001 | Evans et al. ...................... 71/63 |
| 6,253,710 B1 | 7/2001 | Ward et al. .................... 119/171 |
| 6,287,550 B1 * | 9/2001 | Trinh et al. .................. 424/76.6 |
| 6,352,210 B1 * | 3/2002 | Requejo ........................ 239/34 |
| 6,369,290 B1 | 4/2002 | Glaug et al. ................. 604/359 |
| 6,375,983 B1 | 4/2002 | Kantor et al. ................. 424/489 |
| 6,558,706 B2 | 5/2003 | Kantor et al. ................. 424/489 |
| 6,638,591 B2 | 10/2003 | Bowen et al. ................ 428/41.8 |

(Continued)

*Primary Examiner* — Yvonne R. Abbott

(74) *Attorney, Agent, or Firm* — Ernest D. Buff; Ernest D. Buff & Associates, LLC; Dave Narasimhan

(57) ABSTRACT

An odor control additive present in a litter formulation provides release of fragrance or odor masking scent only when litter is used by a cat or other animal within a litter box. The odor control additive comprises a plurality of fragrance scent microcapsules that contain fragrance scent oil. This central, fragrance scent oil is encapsulated in a microcapsule cell wall, which prevents evaporation of the fragrance scent oil and prevents overpowering of litter smell in a closed room resembling an unscented litter composition. When cat or animal enters the litter box, a load is applied to the fragrance scent microcapsules, which readily breaks releasing the fragrance contained therein. The fragrance scent microcapsule cell walls also degrade by swelling and degradation when wet by animal urine thereby releasing fragrance. Fragrance evaporating from the ruptured microcapsules provides odor control and a pleasant scent.

9 Claims, 2 Drawing Sheets

U.S. PATENT DOCUMENTS

| | | | |
|---|---|---|---|
| 6,902,817 B2 | 6/2005 | Bowen et al. | 428/475.2 |
| 7,235,261 B2 | 6/2007 | Smith et al. | 424/493 |
| 7,343,874 B2 * | 3/2008 | DeLeeuw et al. | 119/171 |
| 7,549,396 B2 * | 6/2009 | Hurwitz et al. | 119/171 |
| 7,793,616 B2 * | 9/2010 | Ikegami | 119/173 |
| 2006/0005333 A1 * | 1/2006 | Catalfamo et al. | 15/104.002 |
| 2007/0181071 A1 * | 8/2007 | Hurwitz et al. | 119/171 |
| 2008/0176780 A1 * | 7/2008 | Warr et al. | 510/103 |
| 2008/0208151 A1 * | 8/2008 | Zacharias et al. | 604/361 |
| 2010/0009893 A1 * | 1/2010 | Cavin et al. | 510/441 |
| 2010/0136128 A1 * | 6/2010 | Hurwitz et al. | 424/499 |
| 2010/0249014 A1 * | 9/2010 | Denome et al. | 512/4 |
| 2010/0298191 A1 * | 11/2010 | Denome et al. | 510/220 |

* cited by examiner

ODOR CONTROL ADDITIVE FOR ANIMAL LITTER

CROSS-REFERENCE TO RELATED APPLICATIONS

This application is a continuation-in-part of U.S. application Ser. No. 11/348,723, filed Feb. 7, 2006 now U.S. Pat. No. 7,637,229.

BACKGROUND OF THE INVENTION

1. Field of the Invention

The present invention relates to additives for animal litter; and more particularly to an additive for cat litter, which releases an odor controlling or odor masking substance when the animal uses a litter-box.

2. Description of the Prior Art

Many commercial litter products contain a scent that either over powers the litter smell or simply has ingredients that mask the litter odor. The litter odor is highly objectionable especially in heated or air-conditioned closed rooms. In these products, the scent producing ingredient is incorporated within the cat litter and the scent from the scented litter is released all the time creating over powering smell in the closed room. This overpowering scent is the reason why many people prefer unscented litter and hope to clean the litter box promptly when the litter box is used by the animal. To aid this cleaning process litter compositions have been developed that clump when the litter box is used for urination thereby enabling the prompt easy cleaning of agglomerated clumps. Yet, the unscented litter progressively accumulates malodor and has to be replaced periodically.

Many patents disclose methods for control of odor in animal litter. When animal litter is not of a clumping variety, it is difficult to control the odor since the urine excreted is absorbed over a much larger distance. Clumps are created when the composition of the litter swells during the absorption of pet urine, creating a localized rigid clump. Typical additives for litter which provide this swelling action and urine absorption property include gypsum (calcium sulfate hemi-hydrate) which absorbs water, forming $CaSO_4.2H_2O$, swelling Kaolin or montmorillonite clays. Gums of different variety are also used to dissolve and form a bond, creating clumps. Odor control is generally achieved by adding ingredients to the litter that either mask the odor or add compounds that are anti-bacterial, or other compounds that exhibit pleasant smell.

U.S. Pat. No. 3,675,625 to Miller et al. teaches a litter which is "activated" by heating and then contacted with an odor control agent, such as pine oil, citrus oil, camphor or the like.

U.S. Pat. No. 4,203,388 to Cortigene et al. teaches the use of a deodorant such as sodium bicarbonate, in amounts of between about 1% and about 10% of the dry weight of the litter. Such large amounts of deodorizer are necessitated since the litter itself is also used as an absorbent for urine, requiring the deodorizer to be homogeneously dispersed throughout the particles of the litter.

U.S. Pat. No. 4,405,354 to Thomas et al. discloses the use of buffering agents to prevent gaseous ammonia from escaping into the air. However, such buffering agents serve only to prevent the formation of gaseous ammonia; they are ineffective against other unpleasant odors. Further, the amounts of such agents range from about 0.5% to about 25% by weight, since all of the absorbent litter must be treated with the agent to provide sufficient contact with the urine.

U.S. Pat. No. 4,459,368 to Jaffee, et al. discloses particulate sorbing and deodorizing mixtures containing synthetic and clay sorbents. The composition contains sorbent fuller's earth clay particles and sorbent synthetic particles, e.g. calcium sulfate dihydrate-containing granules, in a weight ratio of about 0.5:9.5 to about 4:6, respectively. This combination of clay minerals and calcium sulfate dihydrate does not provide odor control.

U.S. Pat. No. 4,517,919 to Benjamin et al. discloses the use of undecylenic acid in amounts from about 1000 to about 10,000 ppm and a bacteriostat in amounts from about 25 to 500 ppm. U.S. Pat. No. 5,094,190 to Ratcliff et al. teaches an odor control animal litter to which a boron-containing liquid material has been applied.

U.S. Pat. No. 5,097,799 discloses odor control agents selected from the group consisting of guanidine salts, alkali metal fluorides, alkali metal bisulfites, and mixtures thereof. These agents are applied to the litter using an aqueous dispersion to produce an odor control animal litter.

U.S. Pat. No. 5,183,655 teaches an odor control animal litter that has applied to it an effective amount of pine oil in combination with an effective amount of boric acid.

U.S. Pat. No. 5,329,880 to Pattengill, et al. discloses clumpable animal litter. This waterproof litter contains a mixture of non-smectitic, hydrophilic shale aggregate with a fraction of coarse material with a size less than about 5 mesh (4000 microns). The mixture has the property of agglomerating into a clump upon contact with urine. The agglomerated clump of shale and urine is removable with a perforated scoop. The shale may contain up to 10 weight percent clumping agent selected from the group of water absorbent polymers, corn starch, gelatin, gluten and dried plants of the Plantago family. In addition 5 to 25 wt % ammonia absorbing zeolite may be added for odor control. The odor control agent is an absorbent only for ammonia and does not provide odor control since ammonia is not immediately formed.

U.S. Pat. No. 5,634,431 to Reddy, et al. discloses odor inhibiting pet litter. The addition of urease negative bacteria to sodium smectite clay minerals in pet litter inhibits growth of urease positive bacteria for a period of several days, thereby retarding formation of ammonia and other obnoxious odors. Approximately fifty percent sodium bentonite in the litter causes the litter to clump upon wetting, maintaining the urea in contact with the treated clay and also serving as a buffer to favor growth of the urease negative bacteria. This composition entirely relies on inhibiting ammonia formation and does not provide immediately a pleasant scent.

U.S. Pat. No. 5,806,462 to Parr discloses clumping animal litter. The animal litter is particularly suited for cats. A gelatin solution and a dry adhesive is sprayed onto the granules. The gelatin solution provides enough dampening to adhere the adhesive particles to the clay particles. Because the gelatin sets quickly, it does not provide so much wetting as to activate the adhesive. Therefore, the adhesive retains its adhesive properties and, together with the gelatin, causes the litter to clump when wetted by an animal. This clumping cat litter formulation provides no odor control.

U.S. Pat. No. 5,975,019 to Goss, et al. discloses clumping animal litter. The clumping animal litter utilizes the interparticle interaction of a sodium bentonite, a swelling clay, with a non-swelling clay material. Preferably, sixty percent (60%) by weight, or less, composition of sodium bentonite is used after the judicious selection of particle size distribution such that the mean particle size of the non-swelling clay material is greater than the mean particle size of the sodium bentonite. In addition, an organic clumping agent, such as a pregelatinized corn starch can be combined with the sodium bentonite/clay mixture to enhance clumping properties. This clumping clay litter does not control odor.

U.S. Pat. No. 5,992,351 to Jenkins discloses clumpable animal litter with improved odor control. The clumpable animal litter with improved odor control comprises a) water-swellable clay particles capable of adhering other such particles upon contact with moisture; and b) an odor controlling-effective amount of a boron compound of a composition di-alkali metal tetraborate n-hydrate, wherein n is 4, 5 or 10, which controls odors arising from the contact of said clay particles with moisture.

U.S. Pat. No. 6,206,947 to Evans, et al. discloses a process for making an animal litter comprising gypsum, aluminum sulfate and urea. The animal litter composition is an agglomerated or compacted calcined calcium sulfate absorbent. The animal litter composition is screened to a particle size between 6 mesh and about 100 mesh and an effective amount of a binder such as a clay, lignin or starch is added to the calcium sulfate to assist the calcium sulfate to pelletize. This is a gypsum composition that is agglomerated using aluminum sulfate and urea to chemically combine with gypsum. There is no odor control in this clumping litter composition.

U.S. Pat. No. 6,253,710 to Ward, et al. discloses odor control for animal litter. It uses an odor control liquid and an aerosolized composition for deodorizing and controlling the odor of animal wastes. The liquid and aerosolized composition comprises a non-aqueous volatile carrier and an odor control agent. The liquid and aerosolized composition can be applied in liquid form directly to the animal litter and/or the animal container and/or the animal waste. The litter container may be sprayed with a powdered release agent which may be talc, of talc, inorganic silicone and magnesium powders, sodium bicarbonate, chlorophyll, sodium dihydrogen phosphate, potassium acid phthalates, or their mixtures preventing the stickiness of the odor controlling liquid. The liquid mixes with the litter product and constantly evaporates. Consequently, the odor control agent continuously disseminates and becomes quickly exhausted.

Number of prior art patents relate to micro encapsulation of fragrances and these fragrances are continually released. Some of the patents disclose encapsulation wherein the fragrance is prevented from slow release by having an impervious cell wall.

U.S. Pat. Nos. 6,375,983 and 6,558,706 to Kantor, et al. discloses microencapsulated fragrances and method for preparation. This encapsulated fragrance has a microcapsule from which the fragrance is controlled can be released by exposing the encapsulated fragrance to a solution of a predetermined pH. The encapsulant for the microcapsule is a copolymer of acrylic acid monomer and a one ethylenically unsaturated polymerizable monomer. The copolymer further comprises a pH sensitive carboxyl group or an amine group. The microcapsule encapsulant dissolves when it contacts a solution of appropriate pH. This encapsulated fragrance is not indicated to be usable in a litter.

U.S. Pat. Nos. 6,375,983 and 6,558,706 to Kantor, et al. disclose microencapsulated fragrances and method for preparation. This encapsulated fragrance has a microcapsule from which the fragrance is controlled can be released by exposing the encapsulated fragrance to a solution of a predetermined pH. The encapsulant for the microcapsule is a copolymer of acrylic acid monomer and a one ethylenically unsaturated polymerizable monomer. The copolymer further comprises a pH sensitive carboxyl group or an amine group. The microcapsule encapsulant dissolves when it contacts a solution of appropriate pH. This encapsulated fragrance is not indicated to be usable in a litter.

U.S. Pat. No. 6,369,290 to Glaug, et al. discloses time release odor control composition for a disposable absorbent article. This disposable absorbent article is provided with a odor control powder which is unscented in a dry state and releases a burst of fragrance when wetted, such as by human waste. The powder contains a relatively small amount of fragrance oil, such as 0.5% to 4% by weight, to prevent skin irritation to the wearer. The small amount of fragrance oil is microencapsulated in a starch, which constitutes from about 50% to 90%, and preferably about 70%, of the total weight of the particles. Sodium bicarbonate is also included in the particulate odor control material in an amount ranging from 5.0% to 45%, and preferably about 25% by weight, of the total weight of the particles. The sodium bicarbonate promotes skin wellness by controlling the pH levels of the fragrance oil, starch and human waste. A small amount of flow agent is also contained in the particulate odor control material. The odor control composition is indicated to be used in a disposable absorbent article for absorbing and containing body fluids, comprising an absorbent core and an odor control powder, both located between a fluid pervious cover sheet and a fluid impervious or hydrophobic backing. The odor control powder is substantially unscented when in an initial dry condition, before being wetted, and is capable of releasing a mild fragrance when wetted. The composition is not indicated to be usable in an animal litter.

U.S. Pat. Nos. 6,638,591 and 6,902,817 to Bowen, et al. discloses membrane permeable to aromatic products. This multilayer structure with improved permeation for atmospheric diffusion of aromatic products has a structure with a first permeable layer of a blend of very low density polyethylene and low density polyethylene, a second permeable layer of low density polyethylene, a third permeable layer of a blend of very low density polyethylene and low density polyethylene, a fourth permeable layer of a material selected from a blend of low density polyethylene and a modified polyolefin and a release layer comprising ethylene vinyl alcohol copolymer. The multilayer wall structure of a close extruded cell releases aromatic compound at a slow rate.

U.S. Pat. No. 7,235,261 to Smith, et al. discloses a controlled release encapsulation. The controlled release encapsulated dry powder is formed by an emulsion having a fully hydrolyzed polyvinyl alcohol polymer, a hydrophobic silica, a modified corn starch, and a fragrance oil. The fragrance oil is emulsified in water and spray dried to evaporate the water obtaining the encapsulated dry powder. The dry powder with encapsulated fragrance oil provides controlled release of the fragrance, presumably due to cracks and irregularities present in encapsulation wall.

There remains a need in the art for a cat or animal litter composition containing ingredients that release a pleasant scent only after the cat or animal uses the litter. Also needed in the art is an animal litter composition that does not overpower the environment with litter scent. Further needed is an animal litter composition that eliminates the malaise odor of common litter boxes.

SUMMARY OF THE INVENTION

The present invention provides a litter formulation for a cat or animal litter having fragrance-scented balls that are encapsulated in a capsule shell that either breaks under the weight of the animal and/or swells or degrades in the presence of animal urine, thereby releasing scented fragrances. The breakage of the capsule generally occurs when the animal handles the litter and the water-soluble capsule coating swells, disintegrates or dissolves in water when the animal urinates on the litter. The fragrance-scented balls with encapsulated capsule shell walls are added to an unscented litter, causing the overall litter to be generally unscented; but to release a fragrance when the animal uses the litter box. The litter in the litter box thus does not produce overpowering smell even in closed, temperature-controlled rooms. However, the scent from the scent-fragrance balls is released in those regions that are either disturbed by the animal during litter box usage or from the places where the animal urine permeates in the litter box. This fragrance is delivered at substantially the same time as the cat or the animal disturbs or urinates in the litter, creating an environment free from unpleasant odor.

Generally stated, the fragrance-scented balls have liquid, semi-solid or solid fragrance oil that is coated with a capsule shell wall that contains the fragrance oil. The vapor pressure of fragrance oil is generally greater than one atmosphere at room temperature so that the fragrance is released when the oil is open to air. The microcapsule cell walls may be made from polymers such as polyvinyl alcohol that is impermeable to liquids but is permeable to vapors produced from the fragrance oil. Thus, the fragrance oil slowly releases the fragrance as a function of time and the quantity of fragrance oil within the microcapsule decreases as a function of time. When the all the fragrance contained therein is released, the microcapsule no longer releases any fragrance. When this microcapsule is mixed with an unscented litter, the fragrance scent is always released similar to a conventional animal litter that has a fragrance scent or masking odor mixed therewithin. A closed room becomes overpowered with the fragrance scent from the animal litter and may be objectionable to most people.

In a first embodiment, the capsule walls may be formed from a polymer that is impermeable to both liquid fragrance oil and fragrance oil vapors. Polyethylene polymer and wax capsule shell walls provide this functionality. However, the capsule wall surfaces are readily ruptured when the animal disturbs the litter, thus releasing the fragrance oil scent. There are a number of polymer compositions that are impervious to liquid fragrance scent oil and its vapors. These polymer compositions are generally produced by a cross-linking reaction between a monomer composition that surrounds the fragrance scent oil in a medium such as water. The monomer reacts with a cross linking agent, creating an impervious microcapsule wall surrounding the fragrance scent oil.

In a second embodiment, the capsule walls are made from a water-soluble compound such as starch or pre-digested starch that swells and breaks down when the animal urine contacts the fragrant oil capsule. The fragrance scent oil is mixed as an emulsion with water that has hydrolyzed starch based composition such as hydroxymethyl cellulose. When the composition is spray dried, the starch composition forms an impervious covering surrounding the fragrance oil. The microcapsule wall readily ruptures when handled by the animal during use of the litter box, an act that will release the fragrance scent. When the animal urinates on the litter, the water from the urine softens and swells the starch based microcapsule cell wall releasing additional fragrant scent in the area wetted by the animal urine. If the litter of the clump forming type, the permeation urine is limited and the fragrant scent is only released in this wetted region.

In a third embodiment, the microcapsule with PVA or other vapor permeable membrane is made surrounding a fragrant scent oil is provided with an overcoat of starch based composition essentially blocking the vapor permeability of the microcapsule walls. When a microcapsule of the third embodiment is wetted by urine the fragrance scent is released at a rate the PVA microcapsule cell wall delivers the fragrance. In a similar manner, when the animal disturbs the microcapsule of the third embodiment, the starch impervious layer is compromised, thus releasing the fragrance.

The litter may be provided in the form of an unscented litter mixed intimately with fragrant scent capsules of the first, second or third embodiment. On the other hand, the fragrant scent capsules may be marketed separately and are to be mixed with unscented litter by the user. The fragrant scented capsules are mixed with unscented litter in a proportion ranging from one hundredth of a percent to one percent on a weight basis. The unscented litter may be self-clumping for restraining the movement of urine through the litter to a large distance.

The fragrance oil used may be selected from a number of natural or synthetic fragrances as well as odor masking compounds. Anti-microbial agents may also be included in the microcapsule either in combination with the fragrance oil or as separate microcapsules.

BRIEF DESCRIPTION OF THE DRAWINGS

The invention will be more fully understood and further advantages will become apparent when reference is had to the following detailed description of the preferred embodiments of the invention and the accompanying drawing, in which.

DETAILED DESCRIPTION OF THE INVENTION

Figure 1:
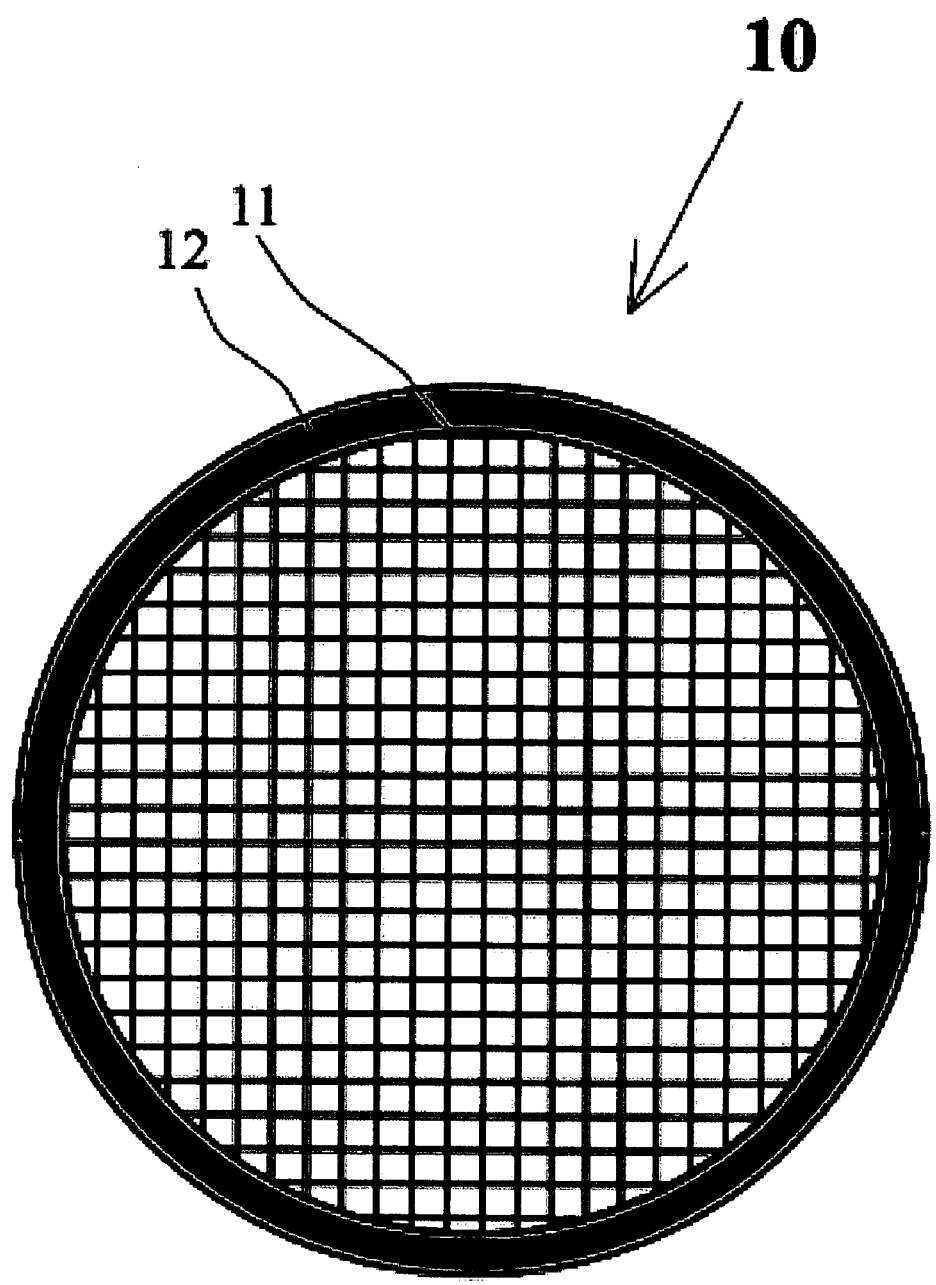
FIG. 1 is a schematic diagram showing a fragrant-scented microcapsule comprising a fragrance oil covered with a microcapsule cell wall layer.

This invention relates to a microcapsule additive containing fragrance scent oil for litters used by cats and other animals. The microcapsule additive releases an odor neutralizing, pleasant fragrance when the litter is used by a cat or animal. The walls of the microcapsule may break during handling by the animal using the litter box. Alternatively, contact of microcapsules with animal urine swells and disrupts the microcapsule cell walls, releasing the fragrant scent contained therewithin. The litter with the microcapsule additives is nominally fragrance free until used by the animal. As such, the litter does not over power the environment of a closed room with litter scent. Generally stated, the additive is a fragrant-scented microcapsule, which may be added to the litter or, alternatively, may be packaged therewith. The fragrant-scented microcapsule includes fragrance oil in the form of a liquid, semi-solid or solid which has a vapor pressure greater than one atmosphere as the fragrance is evaporated and consumed. If the microcapsule cell wall is permeable to vapors while being impervious the liquid fragrance oil, the evaporation of the fragrance is similar to a time-release microcapsule and is quickly consumed. The evaporated fragrance will saturate a closed heated or air conditioned room with the litter scent, a situation not acceptable to most users. The present invention has a microcapsule wall that is generally impervious to both fragrant scent oil and its vapors until is either broken or wetted by water which swells and disrupts the cell walls. Preferably, the fragrant-scented microcapsule additive is used in conjunction with an unscented clumping litter, which reduces or minimizes the spreading of urine due to the clumping action. The clumping litter generally uses a mixture of swelling clay composition together with non-swelling clay composition as discussed in U.S. Pat. No. 5,975,019 to Goss, et al. or a mixture of gypsum with clay as discussed in U.S. Pat. No. 4,459,368 to Jaffee, et al.

Generally stated, the invention involves the use of fragrant-scented microcapsules, which have fragrance scent oil in the form of liquid, semi-solid or solid. These microcapsules with a vapor pressure greater than one atmosphere and releases fragrance, when covered with a vapor pervious microcapsule cell wall. If a vapor permeable cell wall such as polyvinyl alcohol is used, it is further covered by an impervious layer of starch based composition. The fragrance may be an odor neutralizing or masking compound or a pleasant smelling fragrance. A typical odor neutralizing or masking compound is lauryl methacrylate (sold under trade name METAZENE by Pestco Company). The masking compound is dissolved in acetone, a non-aqueous volatile carrier. Representative examples of fragrance components generally include, but are not limited to: volatile phenolic substances (such as iso-amyl salicylate, benzyl salicylate, and thyme oil red); essence oils (such as geranium oil, patchouli oil, and petitgrain oil); citrus oils; extracts and resins (such as benzoin siam resinold and opoponax resinold); "synthetic" oils such as Bergamot 37 and 430, Geranium 76 and Pomeransol 314, and Powder Mask CE-32907); aldehydes and ketones (such as beta-methyl naphthyl ketone, p-tert-butyl-a-methyl hydrocinnamic aldehyde and p-tert-amyl cyclohexanone); polycyclic compounds (such as Coumarin and beta-naphthyl methyl ether); esters (such as diethyl phthalate, phenylethyl phenylacetate). Fragrances also include esters and essential oils derived from floral materials and fruits, citrus oils, absolutes, aldehydes, etc. and alcohols (such as dimyrcetol, phenylethyl alcohol and tetrahydromuguol). Other fragrances include Cherry, Bonsai, Watermelon, Apple, Almond blend, Gamma, Cinnamon, Orange, Lemon, Eucalyptus, Honey Suckle, Citrus Orange, Ambient Neutralizer and Pine Oil.

Generally the fragrances are dissolved in aqueous or non-aqueous carrier and the microcapsule cell wall is provided by well known means. Typical microcapsule formation processes include physical methods or chemical methods. Physical methods include processes such as pan coating, air-suspension coating, centrifugal extrusion, vibrational nozzle and spray drying. Chemical methods include processes of interfacial polymerization, in-situ polymerization and matrix polymerization. Regardless of the methods selected, the microcapsule cell walls have to be compromised when disturbed by an animal and/or when wetted by urine releasing the fragrant scent oil contained therewithin.

The following examples are provided to more completely describe the properties of the present invention. The specific techniques, conditions, materials, proportions and reported data set forth to illustrate the principles and practice of the invention are exemplary only and should not be construed as limiting the scope of the invention.

Example 1

ARA Fragrance Cores manufactures microcapsules that contain fragrance scented oils using a proprietary hybrid of technologies to develop the matrix mold concept. The fragrance oils are first treated with a polymer material then the mixture is subjected to a cross-linking step which solidifies the mixture, entrapping the fragrance oil in a thin coating. This coating is permeable to the vapors of the fragrance, and determines the release rate of the fragrance. The fragrance oil contained therein is selected from Cherry, Bonsai, Watermelon, Apple, Almond blend, Gamma, Cinnamon, Orange, Lemon, Eucalyptus, Honey Suckle, Citrus Orange, Ambient Neutralizer and Pine Oil. The outer surface of the microcapsule is coated with water disintegrating coating such as starch or hydroxyethylcellulose. The microcapsules are mixed with unscented clumping animal litter and fragrance scent is released when the microcapsule is ruptured or treated with water.

FIG. 1 is a schematic diagram showing a fragrant-scented microcapsule 10 having central fragrance scent oil 11 encapsulated within the cell wall of the microcapsule 12. The fragrance oil 11 is shown here as a liquid while it may be a semi-solid or solid and has a vapor pressure greater than one atmosphere. The impervious microcapsule cell wall 12 is manufactured from polymers including polyethylene, polyurethane, or other suitable polymeric materials. The microcapsule substrate has a linear dimension in the range of 1000 to 5000 microns, and the microcapsule cell wall is in the range of 25 to 250 microns. The microcapsule cell wall is selected to prevent the evaporation of the fragrance scent oil. It breaks under load when a cat or animal uses a litter box containing litter with fragrance scent oil, and resists deterioration by urine and other animal excrement.

Figure 2:
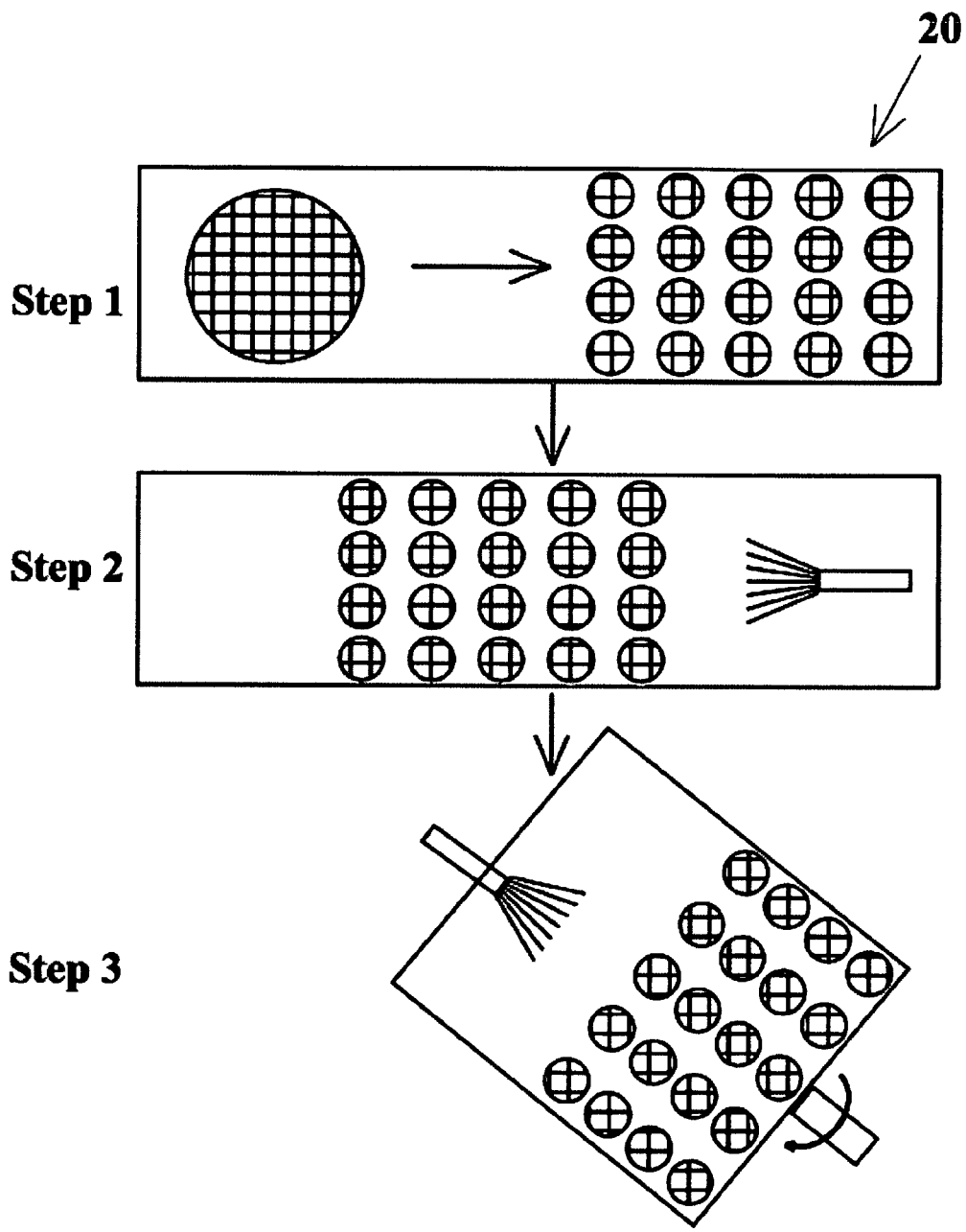
FIG. 2 is a diagrammatic representation of the process of manufacturing a fragrance scent microcapsule for use in a litter box as an additive.

Referring to FIG. 2, there is shown generally at 20 a diagrammatic representation of the process of manufacturing a fragrance scent microcapsule. In step 1, the liquid, semi-solid or solid fragrance scent oil is broken into appropriate sized droplets of chunks. In step 2, a starch coating or suitable polymer cross linking coating is applied over the individual droplets or chunks to create the microcapsule cell wall. This may be accomplished by a liquid immersion process (not shown) or use of a spray process, as shown, that applies a wall coating to form microcapsules. In step 3, the fragrance scent microcapsule cell walls are hardened by a heating process, which may be carried out in a heated rotating drum or barrel. The rotation of the drum or barrel keeps the individual microcapsules apart so that they do not stick to each other.

Significant advantages are realized by practice of the present invention. The key components of the odor control additive for animal litter include, in combination, the features set forth below;

1. a odor control additive for animal litter comprising a plurality of with fragrance scent microcapsules;
2. each fragrance scent microcapsule having a central portion with a fragrance scent oil in the form of a liquid, semi-solid or solid having a vapor pressure greater than one atmosphere;
3. each fragrance scent microcapsule having cell wall that is impervious to fragrance vapor substantially preventing evaporation of the fragrance scent oil contained within microcapsule;
4. The microcapsule cell wall capable of being broken when handled by an animal and or swells and disrupts when contacted by animal urine;
5. the microcapsule cell wall breaking under load of a cat or animal or disrupted by animal urine water while using a litter box containing the litter and fragrance scent microcapsule, triggering release of the fragrance.

The process of manufacturing a fragrant-scented ball includes the steps set forth below:

1. selecting a fragrance oil which may be a liquid, semi-solid or solid with a fragrance vapor pressure greater than one atmosphere;
2. providing microcapsule wall encapsulant that is impervious to the fragrance-scent vapor and is capable of being broken by an animal weight or disintegratable by animal urine;

3. packaging the microcapsule filled with fragrance scent oil as an additive for unscented litter that may be optionally clump forming or mixing them with a unscented litter formulation that is packaged for sale.

Having thus described the invention in rather full detail, it will be understood that such detail need not be strictly adhered to. For example, a neutralizing agent can be used in place of a fragrance to absorb and thereby irradiate odor otherwise produced by urine or defecation on the litter. Upon release, a natural bacteria producing enzyme contained by the neutralizing agent, reproduces itself continuously to eliminate all liter odor. Fragrance-containing tablets, pellets, power or sheets can be used to overpower or neutralize the odor produced by garbage containing vessels. These and additional changes and modifications may suggest themselves to one skilled in the art, all falling within the scope of the invention as defined by the subjoined claims.

What is claimed is:

1. An odor control additive for litter, comprising:
   a. a plurality of fragrance scented microcapsules adapted to be added to litter;
   b. said fragrance scented microcapsules comprising a central portion comprising a fragrance scent oil that is encapsulated in a microcapsule cell wall, said fragrance scent oil is in the form of a liquid, semi-solid or solid;
   c. said fragrant scent oil having vapors at room temperature that have a vapor pressure exceeding one atmosphere pressure;
   d. said microcapsule cell wall being impervious to vapors of said fragrant scent oil;
   e. said fragrance scent oil comprises odor masking compound;
   f. said microcapsule containing fragrant scent oil has a linear dimension of about 1000 to 5000 microns; and
   g. said microcapsule cell wall has a thickness of about 25 to 250 microns;
   whereby said fragrance scent microcapsules are operative to break under the weight of a cat or other animal, or said microcapsules swell or degrade when subject to animal urine thereby releasing fragrance scent.

2. The odor control additive as recited by claim 1, wherein said fragrance scent oil is selected from natural fragrances, synthetic fragrances.

3. The odor control additive as recited by claim 2, wherein said fragrance is a natural plant-base fragrance.

4. The odor control additive as recited by claim 2, wherein said fragrance is a synthetic fragrance replicating a natural fragrance.

5. The odor control additive as recited by claim 1, wherein said odor controlling or odor masking compound is lauryl methacrylate.

6. The odor control additive as recited by claim 1, wherein said fragrance scent oil comprises an antimicrobial composition.

7. The odor control additive as recited by claim 1, wherein said microcapsule cell wall is a thermoplastic resin.

8. The odor control additive as recited by claim 1, wherein said microcapsule cell wall is a thermosetting resin.

9. The odor control additive as recited by claim 1, wherein said microcapsule cell wall is a starch based composition.

* * * * *